(12) United States Patent
Qiu et al.

(10) Patent No.: US 7,824,755 B2
(45) Date of Patent: Nov. 2, 2010

(54) FLUORINATED LEVELING AGENTS

(75) Inventors: Zai-Ming Qiu, Woodbury, MN (US); Naiyong Jing, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 906 days.

(21) Appl. No.: 11/427,662

(22) Filed: Jun. 29, 2006

(65) Prior Publication Data

US 2008/0004392 A1   Jan. 3, 2008

(51) Int. Cl.
*D06N 7/00* (2006.01)
*B32B 5/16* (2006.01)
*E04D 7/00* (2006.01)
*C08L 91/08* (2006.01)

(52) U.S. Cl. .......... 428/142; 428/144; 428/421; 428/403; 428/406; 428/330; 524/487

(58) Field of Classification Search .......... 524/487; 428/142, 144, 421, 403, 406, 330
See application file for complete search history.

(56) References Cited

U.S. PATENT DOCUMENTS

| | | | |
|---|---|---|---|
| 3,163,547 | A | 12/1964 | Vietor |
| 3,900,372 | A | 8/1975 | Childs et al. |
| 4,089,804 | A | 5/1978 | Falk |
| 4,460,734 | A * | 7/1984 | Owens et al. ............... 524/376 |
| 4,610,829 | A | 9/1986 | Lalu et al. |
| 5,218,031 | A | 6/1993 | Nayder et al. |
| 5,466,877 | A | 11/1995 | Moore |
| 5,688,884 | A | 11/1997 | Baker et al. |
| 6,013,795 | A | 1/2000 | Manzara et al. |
| 6,046,368 | A | 4/2000 | Lamanna et al. |
| 6,395,848 | B1 | 5/2002 | Morgan et al. |
| 6,440,321 | B1 | 8/2002 | Audenaert et al. |
| 6,660,828 | B2 | 12/2003 | Thomas et al. |
| 6,824,882 | B2 | 11/2004 | Boardman et al. |
| 6,890,452 | B2 | 5/2005 | Parent et al. |
| 6,905,754 | B2 * | 6/2005 | Jing et al. ............... 428/142 |
| 2003/0092862 | A1 | 5/2003 | Thomas et al. |
| 2003/0203186 | A1 | 10/2003 | Jing et al. |
| 2003/0228469 | A1 | 12/2003 | Boardman et al. |
| 2004/0241396 | A1 | 12/2004 | Jing et al. |
| 2005/0048288 | A1 | 3/2005 | Flynn et al. |
| 2005/0181620 | A1 | 8/2005 | Parent et al. |

FOREIGN PATENT DOCUMENTS

| | | |
|---|---|---|
| DE | 1294949 | 5/1969 |
| FR | 2287433 | 6/1976 |
| JP | 6-293686 | 10/1994 |
| SU | 1019798 | 4/1981 |
| WO | WO 96/36689 | 11/1996 |

OTHER PUBLICATIONS

Abe, T., et al in Chapter 1 of *Preparation, Properties, and Industrial Applications of Organofluorine Compounds*, R. E. Banks, Editor, Ellis Horwood Ltd., Hoisted Press (1982).

Banks, R. E., "Syntheses with perfluoroalkyl radicals from perfluoroalkyl iodides." *Preparation, Properties, and Industrial Applications of Organofluorine Compounds*, Ellis Horwood Ltd, p. 26, (1982).

Brace, N., "Syntheses with perfluoroalkyl radicals from perfluoralkyl iodides", *Journal of Fluorine Chemistry*, vol. 93, pp. 1-25 (1999).

Huang, et al., "The reactions of perfluoro-and $\alpha,\alpha$-dichloropolyfluoralkanesulfinates", *Acta Chimica Sinica*, Eng. Ed., No. 4, pp. 381-386 (1986).

Huang, et al., Perfluoroalkylation of aromatics, *Chinese J. Chem.*, vol. 11, No. 3, pp. 272-279, (1993).

Nagase, S., "Electrochemical Fluorination", *Fluorine Chemistry Reviews*, vol. 1 (1), pp. 77-106 (1967).

Overdiep, W.S., "The Levelling of Paints" *Progress in Organic Coatings*, vol. 14, pp. 159-175 (1986).

Weidner, D. E. et a., "Role of Surface Tension Gradients in Correcting Coating Defects in Corners" *Journal of Colloid and Interface Science*, vol. 179, pp. 66-75 (1996).

U.S. Appl. No. 11/275,269, filed Dec. 21, 2005, entitled "Coatable Composition".

U.S. Appl. No. 11/275,296, filed Dec. 22, 2005, entitled "Fluorinated Surfactants".

U.S. Appl. No. 11/420,262, filed May 25, 2006, entitled "Fluorinated Surfactants".

* cited by examiner

*Primary Examiner*—Michael M Bernshteyn
(74) *Attorney, Agent, or Firm*—Kent S. Kokko

(57) ABSTRACT

A coating composition comprising a fluorinated leveling agent and a film-forming organic polymer is described.

10 Claims, No Drawings

FLUORINATED LEVELING AGENTS

BACKGROUND

Numerous industrial and natural processes involve the flow of thin liquid films. Common applications include liquid paints, floor wax, and wood sealants. In many of these applications, it is desirable to have a uniform (level) coating. Freshly applied liquid films, however, normally have uneven surfaces. These uneven surfaces, along with the dynamics of film drying, can produce coating defects such as orange peel or cratering (i.e., formation of surface blemishes, usually in the form of small round patches).

There is wide industrial interest in reducing and eliminating coating defects. Despite the interest in reducing coating defects, however, finding particular additives that are capable of serving as leveling agents remains an empirical exercise. In general, while some leveling agents are surfactants, the ability of any particular surfactant to lower the surface tension of a solvent or formulation has proven to have little predictive value in determining whether that surfactant would be useful as a leveling agent to reduce coating defects.

A useful leveling agent should be capable of maintaining that surface energy at a nearly constant value during drying. However, drying behavior of a two component system of resin or film-forming polymer and solvent may lead to surface gradients in surfactant that is present as reported, for example, by D. E. Weidner in "Role of Surface Tension Gradients in Correcting Coating Defects in Corners" in *Journal Of Colloid And Interface Science*, vol. 179, pp 66-75 (1996). For example, FIG. 10 of that paper reports that under some circumstances weaker surfactants may result in coatings with greater thickness at the edges, and hence more level, than if stronger surfactants are used.

SUMMARY

In one aspect, the present invention provides useful leveling agents represented by Formula (I) (below):

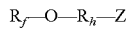  I wherein the $R_f$ group in formula (I) represents a linear or branched perfluorinated (fully fluorinated), saturated aliphatic group optionally interrupted with one or more catenary (in-chain) oxygen atoms;

$R_h$ is a linear or branched, cyclic or acylic, saturated aliphatic group; and

Z is selected from sulfate, sulfonate, phosphate, phosphonate, quaternary ammonium, poly(oxyethylene) or carboxylate groups, which may be present as the acid per se, or the conjugate base thereof.

Recently, perfluoroalkyl carboxylic and sulfonic acids having 8 or more carbon atoms have raised environmental concerns. For example, perfluoroalkanoic acids are not readily biodegradable and eliminate very slowly from the body of living organisms, i.e. they show bioaccumulation. For example, see U.S. Pat. No. 5,688,884 (Baker et al.). As a result, there is a desire for fluorine-containing compositions effective in providing desired functional properties, e.g., water- and oil-repellency, levelling agent properties, etc. while eliminating more effectively from biological systems. Accordingly, measures have been taken to minimize the release of these compounds in the environment and hence methods have been developed to reduce the amount of these levelling agents in aqueous dispersions and other fluoropolymer products.

It would thus be desirable to find alternative fluorinated compounds that can be used in a coating composition comprising a film-forming polymer. Desirably, the alternative fluorinated leveling agents show lower bio-accumulation than perfluoroalkanoic acids having 8 or more carbon atoms, such that despite any remaining amount of the fluorinated leveling agent coating composition, the composition will have less environmental impact. Also, the composition should be more beneficial for manufacturers and users of the composition that may be exposed, for example accidentally, to the fluorinated leveling agents, used in the processes of the invention.

The present compositions provide additional advantages. First, the coating compositions containing the shorter (i.e. $C_2$ to $C_6$) fluoroalkyl groups may be produced at a lower cost per weight because of higher yields while maintaining their potency as effective low surface energy coatings at the same weight basis. For example, the heptafluorobutyryl fluoride precursor may be prepared in yields of 60% as compared to perfluoro-octanoyl fluoride precursor (31%) in an electrochemical fluorination process (*Preparation Properties and Industrial Applications of Organofluorine Compounds*, edited by R. E. Banks, Ellis Horwood Ltd (1982), p 26). Furthermore, the short chain carboxylic acids (the presumed intermediate degradation products) are less toxic and less bioaccumulative than the longer chain homologues.

In another aspect, the invention provides a coatable composition comprising water, a film-forming organic polymer, and a leveling agent represented by Formula (I) (supra). In some embodiments, the coatable compositions further comprise wax or pigment. Coatable compositions according to the present description exhibit desirable leveling behavior that typically results, upon coating on a substrate and drying, in dried coatings with an aesthetically pleasing appearance.

In another aspect, the present invention relates to a method of coating comprising applying a composition to a substrate, the composition comprising water, a film-forming organic polymer, and a leveling agent represented by Formula (I).

In yet another aspect, the present invention relates to a coated article comprising a substrate and a coating. The coating comprises a film-forming organic polymer, and a leveling agent represented by Formula (I).

In this application, all numerical ranges (for example, 2 to 6 carbon atoms) shall be considered to include their endpoints unless explicitly stated otherwise. It will further be understood that non-integral values may be evident to the leveling agents of Formula I, as the composition often comprises a mixture of homologues and isomers.

The term "film-forming organic polymer" refers to a organic polymer that will uniformly coalesce upon drying. Preferably the film forming polymer is a waterborne polymer.

The term "waterborne" means dissolved or dispersed in a liquid material containing water and optionally water-soluble organic solvent; and The term "water-soluble" means at least partially soluble in liquid water.

DETAILED DESCRIPTION

Coatable compositions according to the present description comprise water, a film-forming organic polymer, and a leveling agent of the formula:

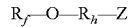  I wherein $R_f$ group in Formula (I) represents a linear or branched perfluorinated (fully fluorinated) aliphatic group optionally interrupted with one or more oxygen atoms;

$R_h$ is a linear or branched, cyclic or acylic, saturated aliphatic group; and

Z is selected from sulfate, sulfonate, phosphate, phosphonate, quaternary ammonium, poly(oxyethylene) or carboxylate groups, which may be present as the acid per se, or the conjugate base thereof. It will be understood that more than one $R_f$—O—$R_h$ group may be bonded to said Z group, for example $(R_f$—O—$R_hO)_2$—P(O)—O$^-$M$^+$ are contemplated.

Preferably $R_h$ is unbranched at the carbon atom alpha to the oxygen atom group for ease of synthesis; i.e. has the structure $R_f$—O—CH$_2$—$R_h'$—Z, where —$R_h$—=—CH$_2$—$R_h'$—. In a preferred embodiment, $R_h$ is a linear or branched aliphatic alkylene of the formula —$C_nH_{2n}$—, where n is 1 to 20, preferably 1 to 10.

The $R_f$ group in formula (I) represents a linear or branched, cyclic or acyclic, perfluorinated aliphatic group optionally interrupted with one or more catenary oxygen atoms. In one embodiment, $R_f$ is a linear perfluorinated aliphatic group having 2 to 6 carbon atoms, preferably having 3 to 5 carbon atoms. According to another embodiment $R_f$ is a linear perfluorinated aliphatic group interrupted with one or more oxygen atoms of which the perfluoroalkylene groups between oxygen atoms have 6 carbon atoms or less, for example 3 or less carbon atoms and wherein the terminal perfluoroalkyl group has 1 to 6 carbon atoms.

It has been found that the ether oxygen linkage of the $R_f$—O—$(CH_2)_n$— moiety provides compounds that are more chemically stable than the corresponding compounds lacking the ether oxygen, as the latter tend to dehydrofluorinate.

In a particular embodiment, $R_f$ may correspond to the following formula:

$$R_f^1-[OR_f^2]_p-[OR_f^3]_q- \qquad (II)$$

wherein $R_f^1$ is a perfluorinated linear or branched aliphatic group of 1 to 6 carbon atoms;

$R_f^2$ and $R_f^3$ each independently represents a linear or branched perfluorinated alkylene of 1 to 6 carbon atoms (preferably 3 or less) and p and q each independently represent a value of 0 to 4 and wherein the sum of p and q is at least 1. $R_f$ groups of Formula II may be prepared using the general procedures desribed in U.S. Pub. 2005/0048288 (Flynn et al.), incorporated herein by reference.

Film-forming polymers suitable for use in the compositions are generally thermoplastic organic polymers containing carbon and hydrogen and optionally oxygen, nitrogen and/or halogen. Examples of suitable polymers include: polyesters, for example, polyethylene terephthalate or polycaprolactone; copolyesters, for example, polyethylene terephthalate isophthalate; polyamides, for example, polyhexamethylene adipamide; vinyl polymers, for example, poly(vinyl acetate/methyl acrylate), poly(vinylidene chloride/vinyl acetate); polyolefins, for example, polystyrene and copolymers of styrene with acrylate(s) such as, for example, poly(styrene-co-butyl acrylate); polydienes, for example, poly(butadiene/styrene); acrylic polymers, for example, poly (methyl methacrylate-co-ethyl acrylate), poly(methyl acrylate-co-acrylic acid); polyurethanes, for example, reaction products of aliphatic, cycloaliphatic or aromatic diisocyanates with polyester glycols or polyether glycols; and cellulosic derivatives, for example, cellulose ethers such as ethyl cellulose and cellulose esters such as cellulose acetate/butyrate. Combinations of film-forming polymers may also be used. Methods and materials for preparing aqueous emulsions or latexes of such polymers are well known, and many are widely available from commercial sources.

One or more film-forming polymers may be present, for example, as an emulsion or latex. Typically the amount of film-forming polymer(s) is in a range of from 1 to 60 percent by weight, preferably 10 to 50 percent by weight, based on the total weight of the coatable composition, however other amounts may also be used.

While coatable compositions according to the present invention may have the film-forming organic polymer dissolved or dispersed solely in water, water-soluble organic solvents may optionally be combined with the water, for example, to facilitate uniform drying and or film-formation. Examples of water-soluble organic solvents include alcohols containing 1 to 4 carbon atoms such as methanol, ethanol, isopropanol, and isobutanol; amides and lactams such as N,N-dimethylformamide, N,N-dimethylacetamide, and N-methylpyrrolidone; ketones and ketoalcohols such as acetone, cyclohexanone, methyl isobutyl ketone, and diacetone alcohol; ethers such as tetrahydrofuran, dioxane, and lower alkyl ethers of polyhydric alcohol such as glycol monomethyl (or monoethyl) ether; alkylene glycols and polyalkylene glycols such as ethylene glycol, propylene glycol, butylene glycol, triethylene glycol, hexylene glycol, diethylene glycol, diethylene glycol monoethyl ether, polyethylene glycol, polypropylene glycol, dipropylene glycol monomethyl ether; 1,3-dimethyl-2-imidazolidinone; and combinations thereof.

Typically, the amount of water and optional water-soluble organic solvent in the coatable compositions will be in a range of from 40 to 99 percent by weight, preferably 50 to 90 percent by weight, based on the total weight of the coatable composition, however, other amounts may also be used. In addition to the optional organic solvent, coatable compositions according to the present invention may also include one or more plasticizers, coating aids, anti-foaming agents, polymer emulsions, cross-linking agents, waxes, pigments, light stabilizers, inorganic fillers, or a combination of two or more.

The Z group of the leveling agent may be present as the free acid, or conjugate base thereof. For example, Z may be selected from —OSO$_3$H, —OP(O)(OH)$_2$ and —CO$_2$H, or may have the structure —OSO$_3^-$M$^+$, —OP(O)O$_2^{2-}$M$^{+2}$ and —CO$_2^-$M$^+$, where M is a cation, including inorganic cations such as alkali metal cations (e.g., Li$^+$, Na$^+$, K$^+$), alkaline earth metal cations transition metal cations, and NH$_4^+$; and organic cations such as onium ions including primary, secondary, tertiary, or quaternary ammonium cations, sulfonium ions, and phosphonium ions.

There are a number of synthetic routes that may be used to prepare the leveling agents. In one reaction scheme, a perfluorinated alkoxide, generated in situ by treatment of a perfluorinated acyl halide or perfluorinated ketone with fluoride ion, may be reacted with a cyclic sulfate to produce a fluorinated sulfate as shown in Scheme II. The sulfate may be hydrolyzed to the alcohol, which may then be oxidized to the carboxylate, which may be further converted to esters or amides by means known in the art. Alternatively, the hydroxy group may be converted to other functional groups by means known to those skilled in the art. For example, the alcohol depicted may be reacted with POCl$_3$ to produce a phosphonate. Alternatively, the alcohol may be reacted with ethylene oxide to produce a compound of Formula I where Z is a poly)oxyethylene group. In Scheme I, $R_f^4$, $R_f^5$ and n are as previously defined. Preferably n is selected so that the indicated cyclic sulfate has five to seven ring members (n=2 to 4).

Thus, the present invention also provides method of preparing fluorinated sulfates of the formula $R_f$—O—$R_h$—OSO3$^-$M$^+$, wherein $R_f$ is a linear or branched, cyclic or acylic, perfluorinated (fully fluorinated) aliphatic group optionally interrupted with one or more oxygen atoms; —$C_nH_{2n}$— is a linear or branched aliphatic groups, $M^+$ a cation, and n is 1 to 10; comprising the step of reacting a perfluorinated alkoxide with a cyclic sulfate. The perfluorinated alkoxide, may be linear or branched, cyclic or acyclic, and may be generated by contacting a perfluorinated ketone or perfluorinated acyl fluoride with fluoride ion, optionally in the presence of a polar, aprotic solvent. The cyclic sulfate may be further substituted by alkyl groups, leading to a branched aliphatic chain. The reaction scheme illustrates a linear, unbranched alkylene groups of the formula $(CH_2)_n$ for simplicity, other groups within the scope of the $R_h$ group of Formula I are within the scope of the reaction scheme.

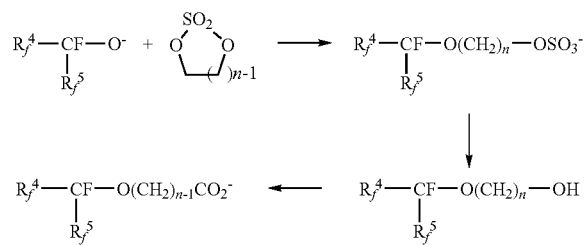

The aforementioned perfluorinated alkoxides can be prepared by reaction of a perfluorinated acyl fluoride or perfluorinated ketone with any suitable source of anhydrous fluoride ion such as anhydrous alkali metal fluoride (e.g., potassium fluoride or cesium fluoride) or anhydrous silver fluoride in an anhydrous polar, aprotic solvent in the presence of a quaternary ammonium compound such as 'ADOGEN 464" available from the Aldrich Chemical Company.

Suitable polar, aprotic solvents include acyclic ethers such as diethyl ether, ethylene glycol dimethyl ether, and diethylene glycol dimethyl ether; carboxylic acid esters such as methyl formate, ethyl formate, methyl acetate, diethyl carbonate, propylene carbonate, and ethylene carbonate; alkyl nitriles such as acetonitrile; alkyl amides such as N,N-dimethylformamide, N,N-diethylformamide, and N-methylpyrrolidone; alkyl sulfoxides such as dimethyl suifoxide; alkyl sulfones such as dimethylsulfone, tetramethylene sulfone, and other sulfolanes; oxazolidones such as N-methyl-2-oxazolidone; and mixtures thereof.

Perfluorinated acyl fluorides and ketones can be prepared by electrochemical fluorination (ECF) of the corresponding hydrocarbon carboxylic acid (or a derivative thereof, using either anhydrous hydrogen fluoride (Simons ECF) or KF2HF (Phillips ECF) as the electrolyte. Perfluorinated acyl fluorides and perfluorinated ketones can also be prepared by dissociation of perfluorinated carboxylic acid esters (which can be prepared from the corresponding hydrocarbon or partially-fluorinated carboxylic acid esters by direct fluorination with fluorine gas). Dissociation can be achieved by contacting the perfluorinated ester with a source of fluoride ion under reacting conditions (see the methods described in U.S. Pat. No. 3,900,372 (Childs) and U.S. Pat. No. 5,466,877 (Moore))

In another route, a perfluorinated alkoxide may be reacted with a cyclic sultone to produce a fluorinated sulfonate as shown in Scheme II. In Scheme III, $R_f^4$, $R_f^5$ and n are as previously defined. Preferably n is selected so that the indicated cyclic sulfone has four to 7 ring members (n=2 to 5). The cyclic sultone depicted by be further substituted by alkyl groups, leading to a branched aliphatic group. The reaction scheme illustrates a linear, unbranched alkylene groups of the formula $(CH_2)_n$ for simplicity, other groups within the scope of the $R_h$ group of Formula I are within the scope of the reaction scheme.

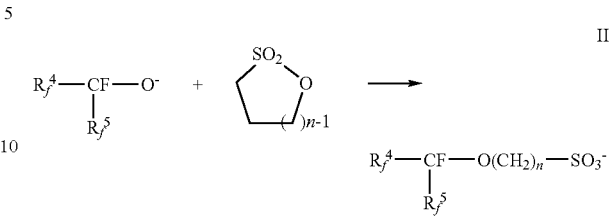

In another route a perfluorinated alkoxide can be further reacted with a carboxylic acid derivative of formula (IV)

$$Y—R_h—Z' \quad (IV)$$

wherein Y represents a leaving group like iodide, bromide, chloride, mesylate, tosylate and the like, n is an integer from 1 to 3, $R_h$ is a linear or branched, cyclic or acylic aliphatic group, and Z' represents a sulfonate, sulfate, phosphonate, phosphate, quaternary ammonium, poly(oxyethylene)carboxylate, or derivatives thereof such as esters and salts, or a functional group that is readily converted to the desired Z group. For example, Z' may be a hydroxyl group that is readily converted to the desired carboxylate group by oxidation. Alternatively, Z' may represent an ester group that may be hydrolyzed to a carboxylate group. The reaction results in fluorinated compounds of formula (III). In Formula III, $R_f^4$, $R_f^5$, Z' and $R_h$ are as previously defined.

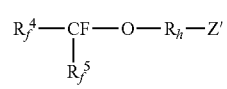

Typically, the amount of leveling agent in the coatable composition will be in a range of from 0.1 parts per million by weight to 10 percent by weight. Preferably, the leveling agent may be present from a level of 1 to 500 parts per million and more preferably at 50 to 200 parts per million. In other embodiments, the leveling agent may be present in an amount of up to 5, up to 10, up to 100, or even up to 1000 parts per million.

In some embodiments, such as those wherein the coatable composition further comprises a wax, the coatable compositions may be used to provide buffable finishes suitable for use as a floor finish or as a motor vehicle or marine finish.

In some embodiments, the film-forming polymer typically has at least one, more typically a plurality, of pendant cross-linkable groups (e.g., —$CO_2H$ or —$CO_2^-$, —$NH_2$, and/or —$CH_2OH$) that are co-reactive with one or more metal complexing agents (e.g., $Zn^{2+}$, $Ca^{2+}$, $Ti^4$.

In some embodiments, the coatable composition may further comprise a cross-linking agent for the organic film-forming polymer. Examples include polyvalent metal cations such as those metal complexing agents listed above as well as $Mg^{2+}$, $Zr^{4+}$, and $Al^{3+}$ ations, borates, polyalkoxysilanes, and polyaziridines.

In some embodiments, the coatable composition may comprise one or more colorants such as dyes or pigments. Such coatable compositions may be used as paint.

The coatable compositions described herein may be coated onto a substrate. Thus, in another aspect, the present invention relates to applying to a substrate a composition comprising water, a film-forming organic polymer, and a leveling agent. The leveling agent is represented by the Formula I as defined hereinabove. Suitable substrates include wood, glass, metal, ceramics, organic and inorganic polymers, plaster, drywall, rock, concrete, and asphalt.

The step of applying may be by any suitable method such as brushing, mopping, bar coating, spraying, dip coating, gravure coating, and roll coating.

In yet another aspect, the present invention relates to a coated article comprising a substrate and a coating. The coating comprises water, a film-forming organic polymer, and a leveling agent. The leveling agent is represented by Formula I as defined above.

Objects and advantages of the invention are further illustrated by the following examples, but the particular materials and amounts thereof recited in these examples, as well as other conditions and details, should not be construed to unduly limit the invention.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Test Methods

Nuclear Magnetic Resonance (NMR):

$^1$H and $^{19}$F NMR spectra were run on a Varian UNITY plus 400 Fourier transform NMR spectrometer (available from Varian NMR Instruments, Palo Alto, Calif.).

Gas Chromatography/Mass Spectroscopy (GCMS):

GCMS samples were run on, for example, a Finnigan TSQ7000 mass spectrometer (available from Thermo Electron Corporation, Waltham, Mass.).

Gas Chromatography (GC):

GC samples were run on a Hewlett Packard 6890 Series Gas Chromatograph, obtainable from Agilent Technologies, Palo Alto, Calif.

Infrared Spectroscopy (IR):

IR spectra were run on a Thermo-Nicolet, Avatar 370 FTIR, obtainable from Thermo Electron Corporation, Waltham, Mass.

Surface Tension Measurements:

For measuring the surface tension of the samples, the leveling agent samples were diluted to the indicated concentration using deionized water. Static surface tension was measured using a Kruss K-12 tensiometer (available from Kiruss GmbH, Germany) and the Du Nouy ring method at 20° C. Dynamic surface tensions were measured at the same concentration using a Sensadyne 5000 Maximum Bubble Pressure Tensiometer (available from Data Physics Instruments, Germany) at a bubble speed of 4 bubbles/second at 20° C.

Leveling Rating Determination:

An aqueous styrene-acrylic emulsion was used to evaluate leveling agent performance. The coating composition (also referred to as floor finish) was similar to the Shield-8 formulation (available from CCP, Kansas City Mo.), except that the standard fluorinated surfactant (Zonyl FSH™) and the hydrosol emulsion leveling agent ((ESI–CRYL™ 842) were removed to facilitate testing of new leveling agents. Samples of this coating composition (floor finish) were prepared for testing by addition of 100 or 200 ppm of experimental leveling agent (based on solids). Leveling agents were generally pre-diluted to 1% solids in water or DPM (or a mixture thereof) prior to addition with stirring at room temperature to the liquid coating composition.

Five mL of the liquid floor finish, containing 100 or 200 ppm of fluorinated leveling agent was applied to the center of a 30 cm×30 cm (12"×12") pre-cleaned black vinyl composite floor tile, then spread using a with a piece of gauze or cheesecloth covering the entire surface area of the tile until an even coating is obtained. The coating was applied using figure eight strokes covering the entire surface area of the tile until an even coating is obtained, then forming an X in the coating from corner to corner of the tile. The process was repeated until a total of five layers of coating had been applied, allowing each coating layer to dry for at least 25-30 minutes prior to reapplication.

Leveling performance was determined by visual inspection of the coating during and after drying of the final coat. Poor leveling can be determined through observation of figure eight strokes and the X applied during the coating process. The coating can appear uneven or have channels from application strokes. Leveling was evaluated using the following criteria:

| Observation | Rating |
|---|---|
| Deep channels or grooves in the X and figure eight pattern | 0 |
| Observation of X and all figure eight application strokes; uneven thickness of coating | 1 |
| Though the coating may appear smooth, can observe X and all 8's | 2 |
| Obvious observation of X and some figure eight patterns | 3 |
| Faint observation of X and little to no figure eight patterns | 4 |
| No observation of X or figure eights at any angle | 5 |

Oil Repellency (OR) Test:

The oil repellency of a treated substrate is measured using the following test. In this test, samples are challenged to penetration by oil or oil mixtures of varying surface tensions. Oils and oil mixtures are given a rating corresponding to the following:

| Oil Repellency Rating Number: | Oil Composition: |
|---|---|
| 0 | (fails Kaydol ™ mineral oil) |
| 1 | Kaydol ™ mineral oil |
| 2 | 65/35 (vol) mineral oil/n-hexadecane |
| 3 | n-hexadecane |
| 4 | n-tetradecane |
| 5 | n-dodecane |
| 6 | n-decane |
| 7 | n-octane |
| 8 | n-heptane |

The Oil Repellency Test is run in the same manner as is the Water Repellency Test, with the reported oil repellency rating corresponding to the highest oil or oil mixture for which the nonwoven web sample passes the test.

It is desirable to have an oil repellency rating of at least 1, preferably a rating of at least 3.

Water Repellency (WR) Test:

The water repellency of a treated substrate is measured using the following test. In this test, samples are challenged to penetrations by blends of deionized water and isopropyl alcohol (IPA). Each blend is assigned a rating number as shown below:

| Water Repellency Rating Number: | Blend (% by volume): |
|---|---|
| 0 | 100% water |
| 1 | 90/10 water/IPA |
| 2 | 80/20 water/IPA |
| 3 | 70/30 water/IPA |
| 4 | 60/40 water/IPA |
| 5 | 50/50 water/IPA |
| 6 | 40/60 water/IPA |
| 7 | 30/70 water/IPA |
| 8 | 20/80 water/IPA |
| 9 | 10/90 water/IPA |
| 10 | 100% IPA |

In running the Water Repellency Test, a nonwoven web sample is placed on a flat, horizontal surface. Five small drops of water or a water/IPA mixture are gently placed at points at least two inches apart on the sample. If, after observing for 15 seconds at a 45° angle, four of the five drops are visible as a sphere or a hemisphere, the nonwoven web sample is deemed to pass the test. The reported water repellency rating corresponds to the highest numbered water or water/IPA mixture for which the nonwoven sample passes the described test. It is desirable to have a water repellency rating of at least 3.

Materials

Unless stated otherwise all materials were obtained from Sigma-Aldrich Company, Milwaukee, Wis.

Kaydol™ Mineral Oil: Obtained from Amoco Chemical Corp., Oakland Calif.

Zonyl FSH™: Obtained form Du Pont de Nemours & Co., Wilmington Del.

Cyclic Sulfates: Ethylene cyclic sulfate (CAS# 1072-53-3) and 1,3-propene cyclic sulfate (CAS# 1073-05-8) were obtained from Sigma-Aldrich Company, Milwaukee, Wis. 1,4-Butene cyclic sulfate was prepared as described below:

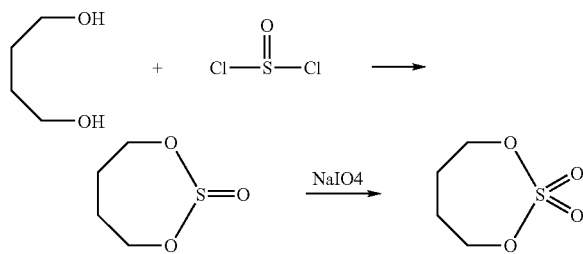

In a 500 mL three-neck flask equipped with a magnetic stir bar, thermometer, addition funnel and reflex condenser connected to a dry nitrogen source and flow bubbler, 28.56 grams ClS(O)Cl (0.24 mol) was slowly added to 18 grams of HO(CH$_2$)$_4$OH (0.2 mol) solution in 100 grams CCl$_4$ at room temperature. Then, the solution was heated to reflux for 4 hours. From GC analysis, no unreacted HO(CH$_2$)$_4$OH was found. The mixture was poured into 100 grams of ice-water, and the bottom organic layer was isolated. The aqueous solution was extracted with 50 mL CH$_2$Cl$_2$ for two times. The combined organic solution was washed with water (2×50 grams). After drying over MgSO$_4$, filtration and rotor evaporation off most solvent, 41 grams liquid was isolated with 59.2% product as identified by GCMS analysis (89.2% yield).

In a 250 mL flask, 31.3 grams NaIO$_4$ (0.1463 mol). 100 grams water, 100 grams CH$_3$CN and 0.1 g RuCl$_3$.H$_2$O catalyst were charged. The solution was cooled to ~10° C., and 22.6 grams butane cyclic sulfite (59.2%, 0.098 mol) was slowly added (exothermic reaction). After addition, the mixture was reacted at 10~20° C. for one hour. GC analysis showed complete conversion. After addition of 100 mL diethyl ether, the top organic solution was isolated. The aqueous solution was extracted with diethyl ether for two times (50 mL×2). The combined organic solution was washed with water, 5% NaHCO$_3$ solution and water again (~25 grams each). After drying over MgSO$_4$, followed by filtration and rotor evaporation, 13.6 grams solid was obtained (GC analysis showed 90.5% purity, 82.6% yield). After recrystalization from CH$_2$Cl-Hexane, 5.2 grams solid was obtained with NMR purity of 96.3%.

General Process for Preparing R$_f$CF$_2$O(CH$_2$)$_n$OH:

R$_f$CF$_2$O(CH$_2$)$_n$OH can be prepared by reaction of acid fluorides with cyclic sulfates according to the general reaction:

R$_f$C(O)F+KF+cyclic sulfate→R$_f$CF$_2$—O—(CH$_2$)$_n$—OSO$_3$K→R$_f$CF$_2$—O—(CH$_2$)$_n$—OH A representative preparation procedure for making n-C$_4$F$_9$—O—(CH$_2$)$_3$—OH is described below:

KF (8.5 grams 0.147 mole), Adogen™ 464 (5.5 grams 0.006 mole), diglyme (40.4 gram) and 1,3-propanediol cyclic sulfate (14.8 grams 0.107 mole) were charged into a clean dry 100 mL Parr reactor. After the reactor was cooled with dry-ice for half hour, n-C$_3$F$_7$COF (21.6 grams 0.10 mole) was transferred into the reactor. Then, the reactor was heated to 52° C. with stirring, and held for 17 hours. The reactor and its content were cooled to room temperature, and 27% KOH (25 grams 0.12 mole) was charged into the reactor at room temperature and held for an additional 4 hours. At the end of 4 hours the solution was acidified with 25% H$_2$SO$_4$ to pH of 1 and hold overnight at 95° C. The bottom layer was isolated (~25 grams). Distillation gave 18.2 grams of product with b.p. of ~40° C./1.0 mmHg (~64% isolated yield). The structure of the product was confirmed by $^1$H/$^{19}$F NMR and GCMS analyses.

The yield of the reaction varies with R$_f$ and n and summarized as follows:

| R$_f$: | n: | Yield (%): | Product: |
|---|---|---|---|
| n-C$_3$F$_7$ | 2 | 54 | C$_4$F$_9$OCH$_2$CH$_2$OH |
| n-C$_3$F$_7$ | 3 | 64 | C$_4$F$_9$OCH$_2$CH$_2$CH$_2$OH |
| n-C$_7$F$_{15}$ | 3 | 60.5 | C$_8$F$_{17}$OCH$_2$CH$_2$CH$_2$OH |
| n-C$_7$F$_{15}$ | 4 | 56 | C$_8$F$_{17}$OCH$_2$CH$_2$CH$_2$CH$_2$OH |
| FSO$_2$C$_3$F$_6$ | 3 | 74.3 | FSO$_2$CF$_2$CF$_2$CF$_2$OCH$_2$CH$_2$CH$_2$OH |

Similarly, R$_f^1$R$_f^2$CF—O(CH$_2$)n—OH can be prepared by reaction of cyclic sulfates with fluorinated ketones according to the following general reaction:

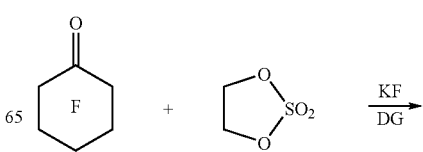

-continued

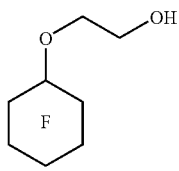

94.4%

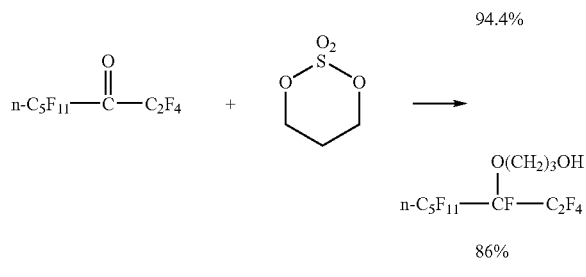

86%

Example 1

Preparation of n-$C_4F_9O(CH_2)_4SO_3H$:

n-$C_4F_9OC_4H_8SO_3K$ was prepared from normal-perfluorobutyl acid fluoride, KF and 1,4-butane sultone and isolated in 92% purity as described in U.S. Pat. No. 6,890,452, as FC-11. The sulfonic acid salt was converted to the corresponding acid through an ion-exchange column packaged with acidified Amberlite IR-120 ion-exchange resin. The corresponding ammonium salt was prepared by adjusting the pH of $C_4F_9O(CH_2)_4SO_3H$ aqueous solution to ~10 with 10% aqueous ammonium solution.

Example 2

Preparation of n-$C_4F_9O(CH_2)_3SO_3K$:

n-$C_4F_9$—O—$C_3H_6$—$SO_3K$ was prepared from normal-perfluorobutyl acid fluoride, KF and 1,3-propane sultone as described in U.S. Pat. No. 6,890,452, as FC-13. The ability of the Example 2 material for use as a leveling agent was determined using the test method described above. Table 2 is a summary of the test results.

TABLE 2

Leveling ratings for Example 2 material compared to Zonyl FSH ™.

| Leveling Agent Solution | | | Leveling Agent Concentration | Leveling Rating of |
|---|---|---|---|---|
| Active Ingredient | % Leveling agent | Solvent | in Coating Composition (ppm) | Coating Composition (0-5) |
| Example 2 | 1.0 | H₂O | 200 | 1 |
| Zonyl FSH ™ | 1.0 | H₂O/DPM | 200 | 4 |

$C_4F_9O(CH_2)_3SO_2NHC_3H_6N(CH_3)_2$ derivative of the Example 2 material was prepared as described in Example 7 of SU1019798, as follows:

$C_4F_9O(CH_2)_3SO_3K+PCl_5 \rightarrow C_4F_9O(CH_2)_3SO_2Cl$ (b.p. 71~79° C./0.3 mmHg);

$C_4F_9O(CH_2)_3SO_2Cl+$
$NH_2CH_2CH_2CH_2NMe_2 \rightarrow C_4F_9O(CH_2)_3$
$SO_2NHC_3H_6N(CH_3)_2$ $C_4F_9O(CH_2)_3SO_2NHC_3H_6N^+(CH_3)_2HOAc^-$ was prepared from the aqueous solution of $C_4F_9O(CH_2)_3SO_2NHC_3H_6N(CH_3)_2$ by addition of acetic acid to pH ~6. Additionally, $C_4F_9O(CH_2)_3SO_2NHC_3H_6N^+O^-(CH_3)_2$ derivative of the Example 2 material was prepared by addition of aqueous $H_2O_2$ (30%) solution to $C_4F_9O(CH_2)_3SO_2NHC_3H_6N(CH_3)_2$ aqueous solution and letting it stand at room temperature for 24 hours.

Example 3

Preparation of $(C_4F_9OCH_2CH_2CH_2O)_2P(O)ONH_4$:

Example 3 material was prepared according to the reaction as follows:

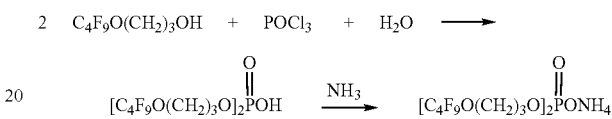

In a 50 mL three-necked flask equipped with a magnetic stir bar, thermometer and a cooling water condenser connected to nitrogen, 2.60 grams (17 mmol) $POCl_3$ and 5 grams toluene were charged. The solution was cooled to 0° C. with ice water bath, and 0.3 grams (17 mmol) of water was added slowly via a syringe while maintaining the temperature below 5° C. After addition, the mixture was reacted at this temperature for one hour. Then, a solution of 10 grams of $C_4F_9OCH_2CH_2CH_2OH$ (MW=294, 34 mmol) in 10 grams of toluene was added. The solution was heated to ~95° C. for 24 hours. After cooling down to room temperature, the solvent was removed by rotor evaporator to give 11.60 grams liquid product. GCMS analysis confirmed the formation of $(C_4F_9OCH_2CH_2CH_2O)_2P(O)ONH_4$ as major product, in addition to small amount of $(C_4F_9OCH_2CH_2CH_2O)_3P(O)(ONH_4)_2$ (~8%). 1.0 grams of the product was diluted with 9.0 grams isopropyl alcohol and 40 grams water (the pH of which was adjusted to ~9 with $NH_3$ to give a 2% solution.

Additionally, the oil and water repellency of the Zonyl FSH™ and Example 3 materials were measured at 1% solution as described above. Both the Example 3 and Zonyl FSH™ materials failed the water repellency test, however, the oil repellency of Example 3 material was 8 compared to an oil repellency of 5 for Zonyl FSH™.

Example 4

Preparation of $C_4F_9OCH_2CH_2CO_2NH_4$:

Example 4 material was prepared according to the reaction as follows:

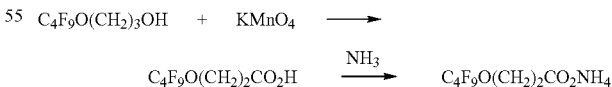

In a 250 mL three-necked flask equipped with a magnetic stir bar, thermometer and a cooling water condenser connected to nitrogen, 6.2 grams $C_4F_9OCH_2CH_2CH_2OH$ was added to a solution of 0.75 grams $Na_2CO_3$ in 7.5 grams $H_2O$. Then, a solution of 4.5 grams $KMnO_4$ in 70 grams of water was added at room temperature in one hour. After addition, the solution was heated to 70° C. for five hours. After cooling the solution to room temperature, black solid ($MnO_2$) was removed by filtration. The obtained red solution was acidified with 50% $H_2SO_4$ to give a colorless solution. The colorless solution was extracted with diethyl ether (3×50 mL), and the combined ether solution was dried over anhydrous $Na_2SO_4$. After filtration and rotor evaporation of the solvent, 4.6 grams (~71% yield) residue was obtained. From FTIR analysis, 1726.36 $cm^{-1}$ signal was observed, indicating the formation of acid. The product was further confirmed by GCMS spectra with MW=307. The acid was neutralized with 5% $NH_3/H_2O$, and a solid was isolated after drying. The solid was dissolved in water to 0.1% solution. The surface tension of the solution was measured and reported below in comparison with the corresponding perfluorinated FC-143 prepared by the reaction of $C_8F_{17}SO_2NEtCH_2CH_2OH$, $POCl_3$ and water (sold by 3M Company, St. Paul, Minn.). Table 3 is a summary of the surface tension data for the Example 4 and FC-143 materials.

TABLE 3

Summary of the surface tension data for the Example 4 and FC-143 materials
Leveling agent:

| $C_7F_{15}CO_2NH_4$ (FC-143) | | $C_4F_9O(CH_2)_2CO_2NH_4$ | |
| --- | --- | --- | --- |
| Concentration (ppm) | Surface Tension (mN/m) | Concentration (ppm) | Surface Tension (mN/m) |
| 0 | 72.44 | 0.000 | 72.44 |
| 255.2 | 65.39 | 62.5 | 50.9 |
| 450.1 | 61.75 | 125 | 39.97 |
| 751.2 | 57.23 | 250 | 30.15 |
| 1210 | 52.38 | 500 | 22.96 |
| 1894 | 47.27 | 1000.000 | 22.84 |
| 2881 | 41.09 | | |
| 4243 | 35.18 | | |

Example 5

Preparation of i,n-$C_4F_9OCH_2CO_2NH_4$:

Potassium fluoride (48.2 grams, 0.83 mol), anhydrous diglyme (124 grams), Adogen™ 464 (17.7 grams of a 50% solution in anhydrous diglyme, 0.019 mol) and $BrCH_2CO_2CH_3$ (100.5 grams, 0.65 mol) were placed in a 600 mL Parr reaction vessel and the vessel sealed, cooled with an external dry ice/acetone bath and evacuated. i-$C_3F_7COF$ (94% acid fluoride in an 88/12 iso/normal ratio, prepared by electrochemical fluorination, 150.8 grams, 0.065 mol) was added to the cold reaction vessel and the mixture heated with stirring to 70° C. for about 45 hours. The reactor was then cooled to room temperature, vented and the reaction mixture vacuum filtered to remove the solids. Water was added to the filtrate, the lower phase separated and washed twice with water to afford 186 grams of crude product which was about 72% i,n-$C_4F_9OCH_2CO_2CH_3$ (ether ester) and which also contained about 6% i,n-$C_3F_7CO_2CH_2CO_2CH_3$ (bis-ester). This mixture was one-plate distilled under vacuum (0.007 atmospheres) and then the distillate re-distilled at atmospheric pressure in a concentric tube column with the main cut collected from 145-150° C. having a purity of about 97% desired ether ester and 2% of the bis-ester. This reaction sequence was repeated using n-$C_3F_7COF$ (about 90/10 normal/iso ratio) and the distillation cuts combined to give 110 grams of 96% desired ether ester still containing about 2-3% of the bis-ester. These structures were confirmed by GCMS.

This mixture was dissolved in 125 mL of methyl t-butyl ether and ethanolamine (2 grams, 0.033 mol) added with an additional 1.3 grams ethanolamine added after two hours. The reaction mixture was stirred for 16 hours at room temperature. The reaction solution was then washed with about 2% aqueous HCl and water, dried and the solvent removed by rotary evaporation and the residue distilled in the concentric tube column with the product distilling at 149° C. in 99.8% purity, 75 grams.

The purified ether ester (75 grams, 0.24 mol) was dissolved in about 200 mL of methanol and a solution of hydrated lithium hydroxide (10.2 grams, 0.24 mol) added in portions until the pH was approximately 7. The methanol was then removed by rotary evaporation to afford 77 grams of a viscous oil of the lithium salt. This oil was dissolved in water and ammonium fluoride (9 grams, 0.24 mol) dissolved in 50 mL water was then added to the aqueous solution over about one minute. An immediate precipitation of lithium fluoride occurred. The solution was filtered and the clear filtrate then placed on the rotary evaporator to remove the water solvent to give 70 grams of the desired ammonium salt.

Table 4 is a summary of the surface tension data for the Example 5 materials.

TABLE 4

Summary of the surface tension data for the Example 5 material.

| Concentration (ppm) | Surface Tension (mN/m) |
| --- | --- |
| 0.000 | 72.69 |
| 156.25 | 71.55 |
| 312.5 | 70.84 |
| 625 | 68.51 |
| 1250 | 61.25 |
| 2500.000 | 53.22 |
| 5000 | 43.21 |
| 10000 | 33.04 |

What is claimed is:

1. A coatable composition comprising:
   a) water;
   b) 1 to 60 percent by weight of a film-forming organic polymer based on the total weight of the coatable composition; and
   c) 1 to 500 parts per million of a leveling agent based on the total weight of the coatable composition represented by the formula:

$R_fOR_h$—Z wherein $R_f$ represents a linear or branched perfluorinated aliphatic group optionally interrupted with one or more oxygen atoms;

$R_h$ is a linear or branched, cyclic or acylic, saturated aliphatic group; and

Z is selected from sulfate, sulfonate, phosphate, phosphonate, quaternary ammonium, poly(oxyethylene) or carboxylate groups, wherein the film-forming organic polymer is selected from an acrylic polymer, a urethane polymer, a polyvinyl alcohol, an acrylate copolymer, and combinations thereof.

2. A composition according to claim 1, wherein the film-forming organic polymer comprises at least one of a polymer latex or an emulsified polymer.

3. A composition according to claim 1, further comprising a wax.

4. A composition according to claim 3, further comprising a metal complexing agent.

5. A composition according to claim 1, further comprising a crosslinking agent for the organic polymer.

6. A composition according to claim 5, wherein the crosslinking agent comprises a polyvalent metal cation selected from $Ca^{2+}$, $Mg^{2+}$, $Zn^{2+}$, $Zr^{4+}$, $Al^{3+}$, and combinations thereof.

7. A composition according to claim 1, further comprising a pigment.

8. The composition of claim 1, wherein said $R_f$ group is of the formula:

$$R_f^1-[OR_f^2]_p-[OR_f^3]_q-$$

wherein $R_f^1$ is a perfluorinated linear or branched aliphatic group of 1 to 6 carbon atoms; $R_f^2$ and $R_f^3$ each independently represents a linear or branched perfluorinated alkylene of 1 to 6 carbon atoms and p and q each independently represent a value of 0 to 4 and wherein the sum of p and q is at least 1.

9. A method of coating comprising applying to a substrate the coatable composition of claim 1.

10. A coated article comprising:
a) a substrate; and
b) the dried coatable composition of claim 1.

* * * * *

UNITED STATES PATENT AND TRADEMARK OFFICE
CERTIFICATE OF CORRECTION

PATENT NO. : 7,824,755 B2  Page 1 of 1
APPLICATION NO. : 11/427662
DATED : November 2, 2010
INVENTOR(S) : Zai-Ming Qiu It is certified that error appears in the above-identified patent and that said Letters Patent is hereby corrected as shown below:

Column 2,
Line 21, after "Preparation" insert -- , --.
Line 21, after "Properties" insert -- , --.

Column 3,
Line 43, delete "desribed" and insert -- described --.

Column 4,
Line 11, delete "and or" and insert -- and/or --.
Line 66, delete "OSO3⁻M⁺," and insert -- $OSO_3^-M^+$, --.

Column 5,
Line 43, delete "suifoxide;" and insert -- sulfoxide; --.
Line 59, after "(Moore))" insert -- . --.

Column 7,
Line 53, delete "Kiruss" and insert -- Kruss --.

Column 9,
Line 49, delete "NaIO4" and insert -- $NaIO_4$ --.

Column 10,
Line 53, delete "n-$C_7F_15$" and insert -- n-$C_7F_{15}$ --.

Column 15,
Line 3, delete "$Zn^{2\ +}$," and insert -- $Zn^{2+}$, --.

Signed and Sealed this
Eighth Day of February, 2011

David J. Kappos
*Director of the United States Patent and Trademark Office*